Figure 1:
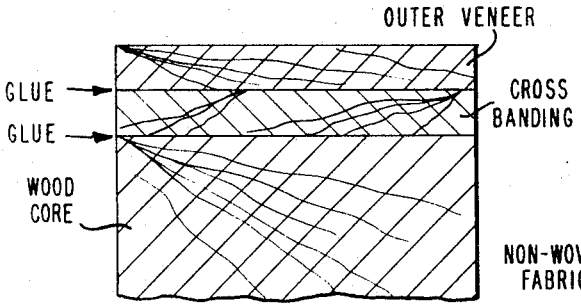
Figure 2:
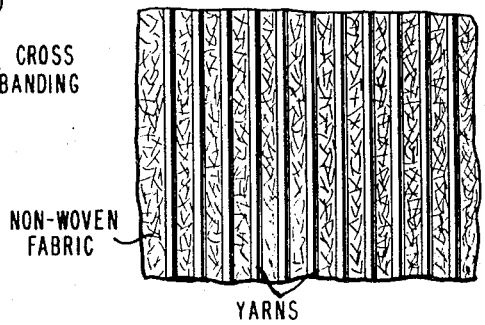
Figure 3:
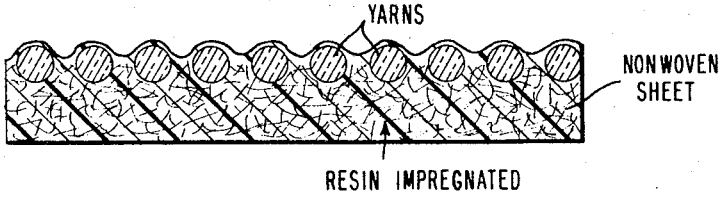
Figure 4:
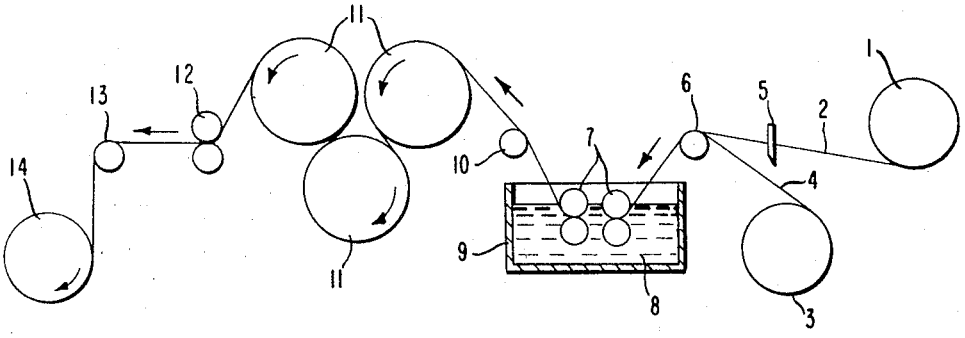

T862007

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 23

745,589
FIBROUS CROSSBANDING SHEETS FOR VENEERED STRUCTURES

Thomas C. Dunn, Runnymeade, Hockessin, Del., assignor to E. I. du Pont de Nemours and Company, Wilmington, Del., a corporation of Delaware

Filed July 17, 1968. Published May 6, 1969
Int. Cl. B32b *3/18, 21/14;* D04h *5/00*
U.S. Cl. 161—141
1 Sheet Drawing. 30 Pages Specification

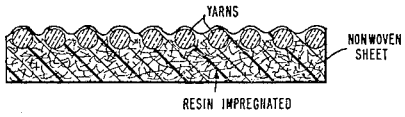

Novel crossbanding materials for use in the manufacture of veneered plywood and furniture structures comprise a resin impregnated assembly of a fibrous carrier sheet and an array of substantially straight parallel continuous elongated elements spaced along the width of the sheet, said elements each being no greater than about 0.025 inch in diameter, the total modulus of the elements per inch width of sheet being greater than about 30 pounds and the crossbanding structure having an air porosity of at least about 1 $ft.^3/min./in.^2/10$ p.s.i.a.

T862007

SN - 745589

May 6, 1969 T. C. DUNN DEF. PUB.

FIBROUS CROSSBANDING SHEETS FOR VENEERED STRUCTURES

Filed July 17, 1968

INVENTOR
THOMAS C. DUNN

BY Sol Schwartz
ATTORNEY